United States Patent
Teraoka et al.

[11] Patent Number: 6,076,623
[45] Date of Patent: Jun. 20, 2000

[54] FOUR-WHEEL DRIVE VEHICLE POWER TRAIN

[75] Inventors: Masao Teraoka; Yasuhiko Ishikawa; Hiroyuki Tanaka, all of Tochigi, Japan

[73] Assignee: Tochigi Fuji Sangyo Kabushiki Kaisha, Japan

[21] Appl. No.: 08/965,728

[22] Filed: Nov. 7, 1997

[30] Foreign Application Priority Data

Nov. 8, 1996 [JP] Japan ................................. 8-296778

[51] Int. Cl.[7] .................................................. B62B 1/00
[52] U.S. Cl. ....................... 180/233; 180/248; 180/249; 180/250
[58] Field of Search .................... 180/233, 248, 180/249, 250

[56] References Cited

U.S. PATENT DOCUMENTS

| | | | |
|---|---|---|---|
| 4,805,718 | 2/1989 | Iwata et al. | 180/233 |
| 4,903,811 | 2/1990 | Kobayashi et al. | 180/233 |
| 5,222,573 | 6/1993 | Kameda et al. | 180/233 |
| 5,282,518 | 2/1994 | Yamasaki et al. | 180/233 |
| 5,409,429 | 4/1995 | Showalter et al. | 180/233 |

*Primary Examiner*—Daniel G. DePumpo
*Assistant Examiner*—James S. McClellan
*Attorney, Agent, or Firm*—Graham & James LLP

[57] ABSTRACT

A first power train (T1) for driving a pair of front drive wheels (Wf1, Wf2) comprises a transmission (4) connected to an engine (2) and a front drive train (41f) connected to the drive wheels, the front drive train including a final reduction gear (43), and a second power train (T2) for driving a pair of rear drive wheels (Wr1, Wr2) comprises a rear transfer train (11) branched from the first power train, between the transmission and the front drive train, and a rear drive train (41r) connected to the rear drive wheels.

1 Claim, 6 Drawing Sheets

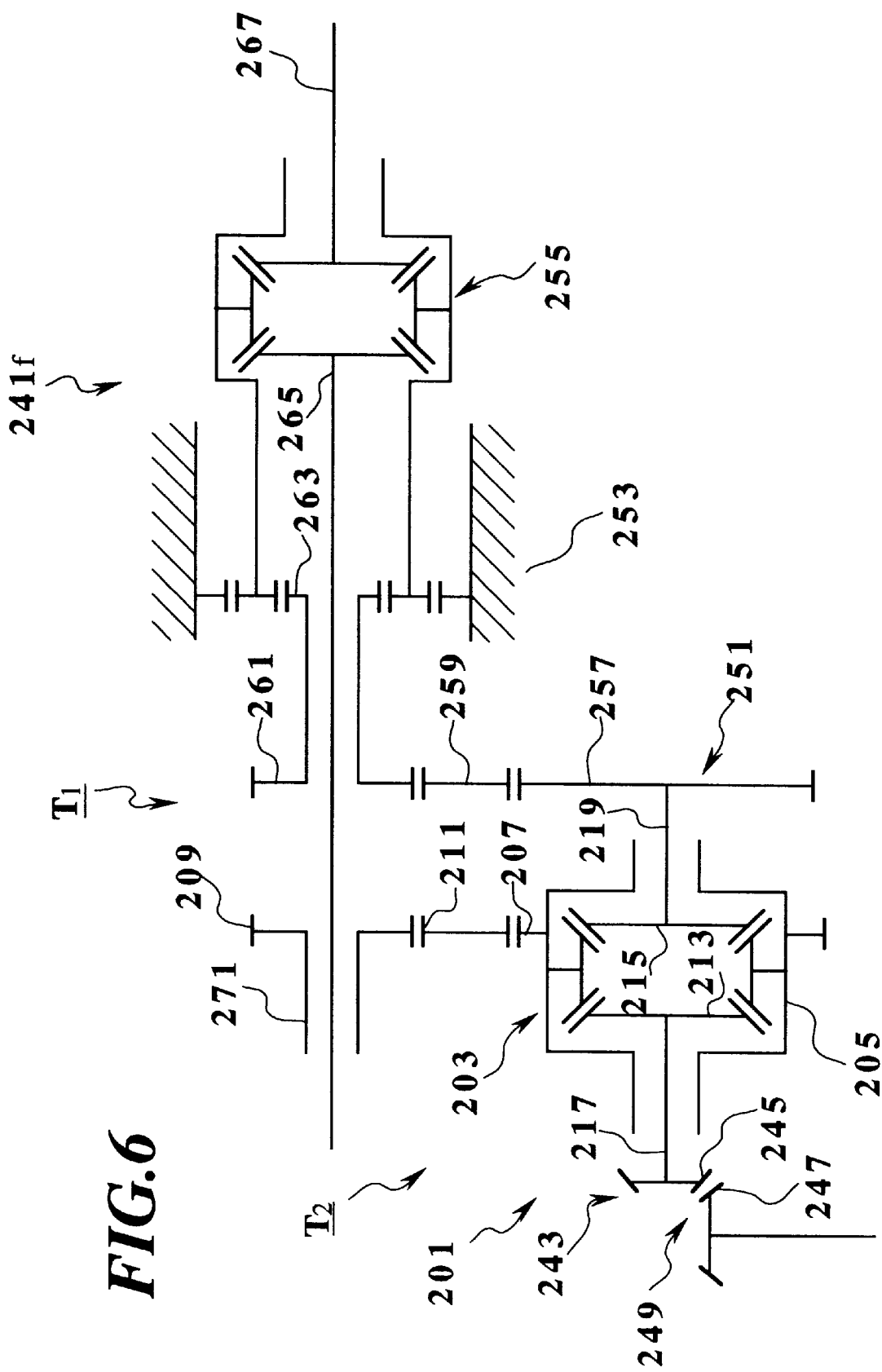

FOUR-WHEEL DRIVE VEHICLE POWER TRAIN

BACKGROUND OF THE INVENTION

1. Field of the Invention

The present invention generally relates to a power train, and particularly, it relates to a power train for four-wheel drive vehicles.

2. Description of Relevant Art

There has been disclosed a four-wheel drive vehicle power train in Japanese Patent Application Laid-Open Publication No. 3-224829, and another four-wheel drive vehicle power train in U.S. Pat. No. 5,188,574.

The former power train is shown in FIG. 1, where it is designated by reference character 301. The power train 301 includes a front drive train 309+311+317 and a rear transfer train 323. The front drive train is arranged at an output end of a transmission 305 which is mounted in parallel to a transversely arranged horizontal engine 303 and put in a coaxial relation to left and right front axles. The drive train includes a planetary type final reduction gear 309, a planetary type center differential gear 311 and a front differential gear 317.

Drive torque from the transmission 305 is supplied from an output shaft 307 thereof, via the final reduction gear 309, to a ring gear 313 of the center differential gear 311, where it is shared to be distributed on the one hand from a pinion carrier 315 of the center differential gear 311 through the front differential gear 317 to the front axles, and on the other hand, from a sun gear output shaft 319 via a gear train 321 to the rear transfer train 323, where it is changed in direction to be transmitted via a rear drive train to rear axles.

Drive torque is increased by a speed reduction at the final reduction gear 309, before it enters the center differential gear 311. The reduction gear 309 is indispensable to drive the front axles.

The latter power train is shown in FIG. 2, where it is designated by reference character 405. The power train 405 has a front drive train 409+407+411 and a rear transfer train 413. Drive power from an engine 401 is transmitted via a transmission 403, where it is once changed in speed, to the front drive train, where it is again changed in speed at a final reduction gear 409 before it enters a center differential gear 407 of a planetary type.

In the conventional power trains described, the rear transfer trains are branched from the center differential gears 311, 407 receiving increased torque to drive front axles and have their and associated components increased in size and weight. Such rear transfer trains may be mounted in a vehicle, with their centers of gravity transversely and/or longitudinally offset from a center of gravity of the vehicle, unfavorably displacing this gravity center, causing an undesirable distribution of loads to be imposed on driving road wheels.

The four-wheel drive vehicle power trains may have their components partially employed in two-wheel drive vehicle power trains. However, the existence of power input mechanisms which supply torque to center differential gears 311 and 407 results in the need for significantly different power train configurations for two-wheel drive and four-wheel drive vehicles, with a correspondingly low level of power train component interchangeability.

SUMMARY OF THE INVENTION

The present invention has been achieved with such points in view.

It therefore is an object of the present invention to provide a power train without a final reduction gear interposed between a transmission output shaft and a power transfer train, permitting the transfer train's and associated components to be reduced in size and weight, allowing for a favorable allocation of a center of gravity and a favorable distribution of loads to road wheels.

To achieve the object, a first aspect of the invention provides a power train for a vehicle with an engine and a total of four drive wheels, the power train comprising a first power train for driving a first pair of drive wheels, the first power train comprising a transmission connected to the engine, and a first drive train connected to the first pair of drive wheels, the first drive train including a first final reduction gear, and a second power train for driving a second pair of drive wheels, the second power train comprising a power transfer train branched from the first power train between the transmission and the first drive train, and a second drive train connected to the second pair of drive wheels.

According to the first aspect, decreased drive torque is transmitted through a power transfer train.

Accordingly, the power transfer train is permitted to be compact and light weight.

According to a second aspect of the invention depending from the first aspect, the power train further comprises a drive mechanism for branching the power transfer train from the first power train.

According to the second aspect, a drive mechanism affords an ensured power branching.

According to a third aspect of the invention depending from the second aspect, the drive mechanism comprises a chain drive member.

According to the third aspect, a power transfer train is allowed for flexible longitudinal displacement in design to have a center of gravity optimized in position.

According to a fourth aspect of the invention depending from the second aspect, the drive mechanism comprises a differential gear set.

According to the fourth aspect, a center differential gear may be designed compact with a light weight.

According to a fifth aspect of the invention depending from the second aspect, the power train further comprises a first cover for enclosing the first drive train, and a second cover for enclosing the drive mechanism, the second cover being separable from the first cover.

According to the fifth aspect, a power train has an increased interchangeability between a four-wheel drive and a two-wheel drive.

According to a sixth aspect of the invention depending from the first aspect, the transmission has an output shaft connected to the first drive train, and the first pair of drive wheels have axles thereof either extending through the output shaft.

According to the sixth aspect, a power transfer train is allowed for flexible transverse displacement in design to have a center of gravity optimized in position.

According to a seventh aspect of the invention depending from the first aspect, the first drive train includes a first differential gear set connected between the first final reduction gear and the first pair of drive wheels, and the second drive train includes a second final reduction gear connected to the power transfer train, and a second differential gear set connected between the second final reduction gear and the second pair of drive wheels.

According to the seventh aspect, drive torque is increased when entering a differential gear set for power distribution between a respective pair of drive wheels.

According to an eighth aspect of the invention depending from the first aspect, the first pair of drive wheels comprise a pair of left and right front wheels of the vehicle, and the second pair of drive wheels comprise a pair of left and right rear wheels of the vehicle.

According to the eighth aspect, a first power train has a rear transfer train branched therefrom between a transmission and a front final reduction gear.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 6 is a block diagram of a power train according to another embodiment of the invention.

DETAILED DESCRIPTION OF THE PREFERRED EMBODIMENTS

Figure 1:
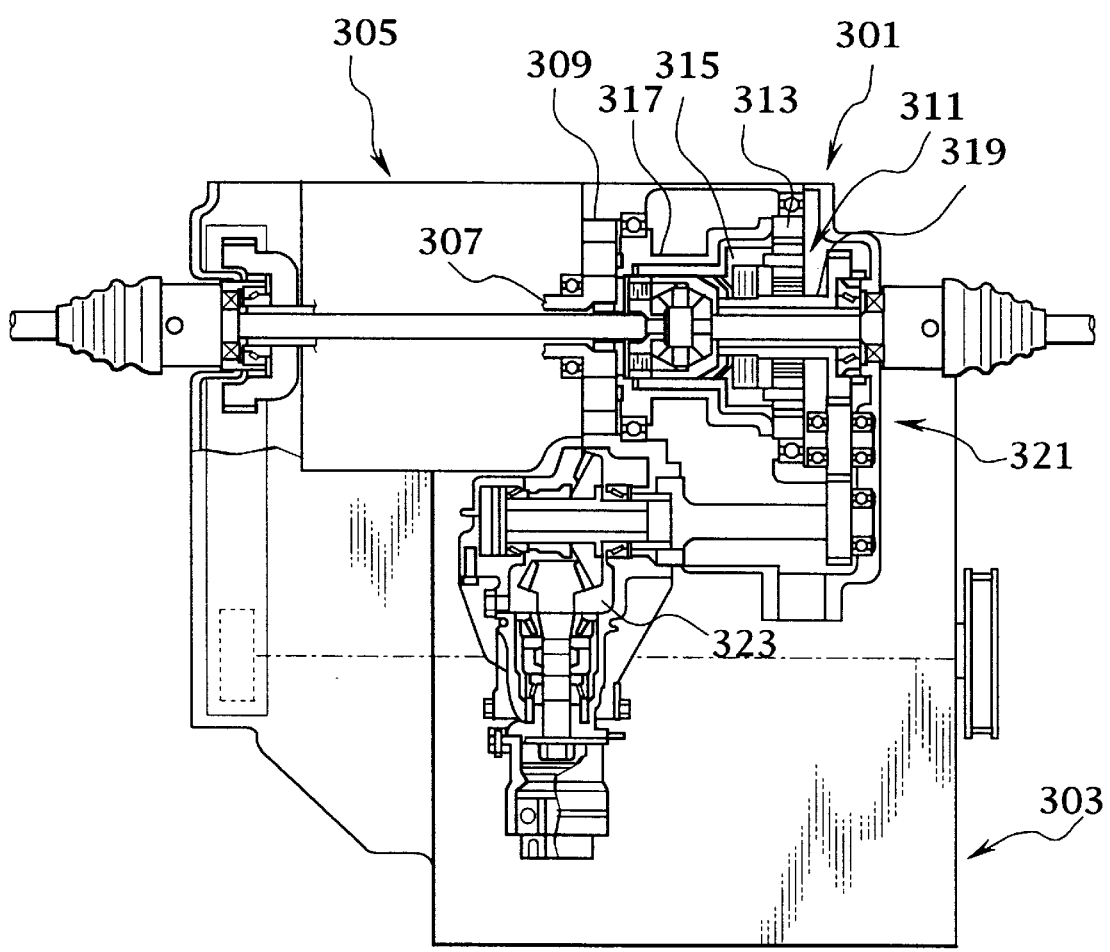
FIG. 1 is a section of a conventional power train.
Figure 2:
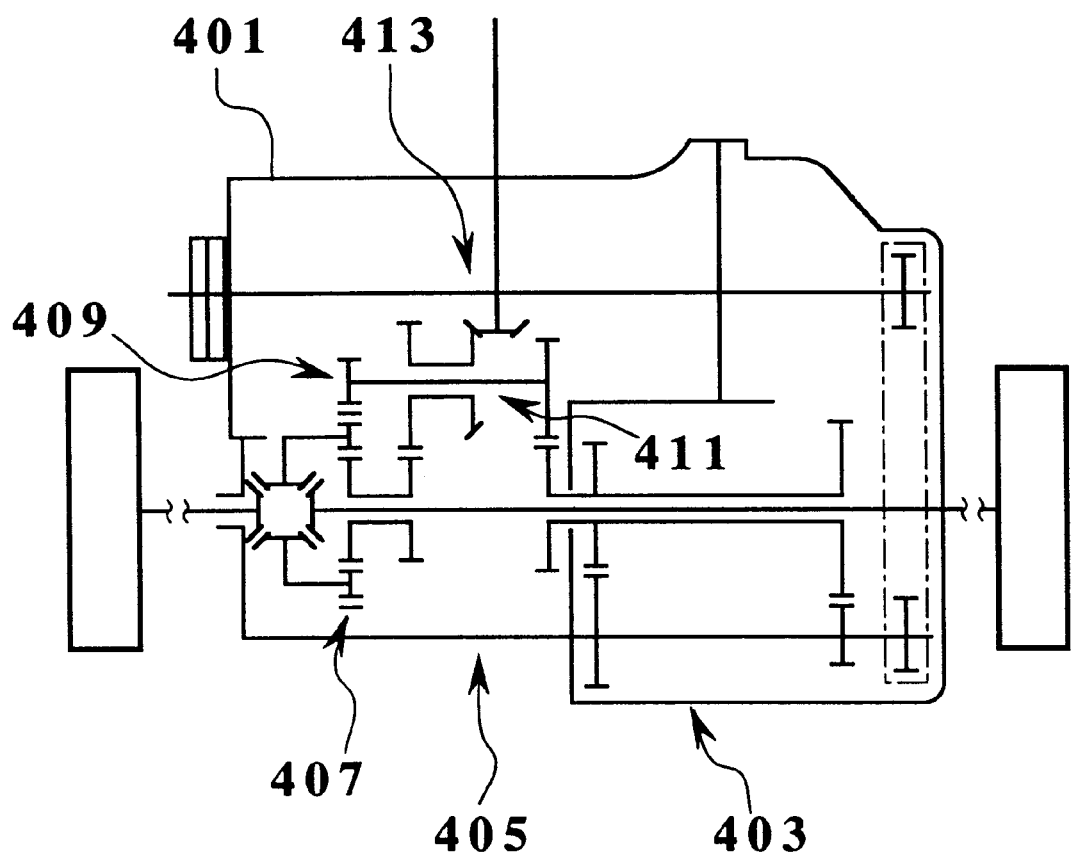
FIG. 2 is a block diagram of another conventional power train.

There will be detailed below the preferred embodiments of the present invention with reference to FIGS. 3 to 6. Like members are designated by like reference characters.

Figure 3:
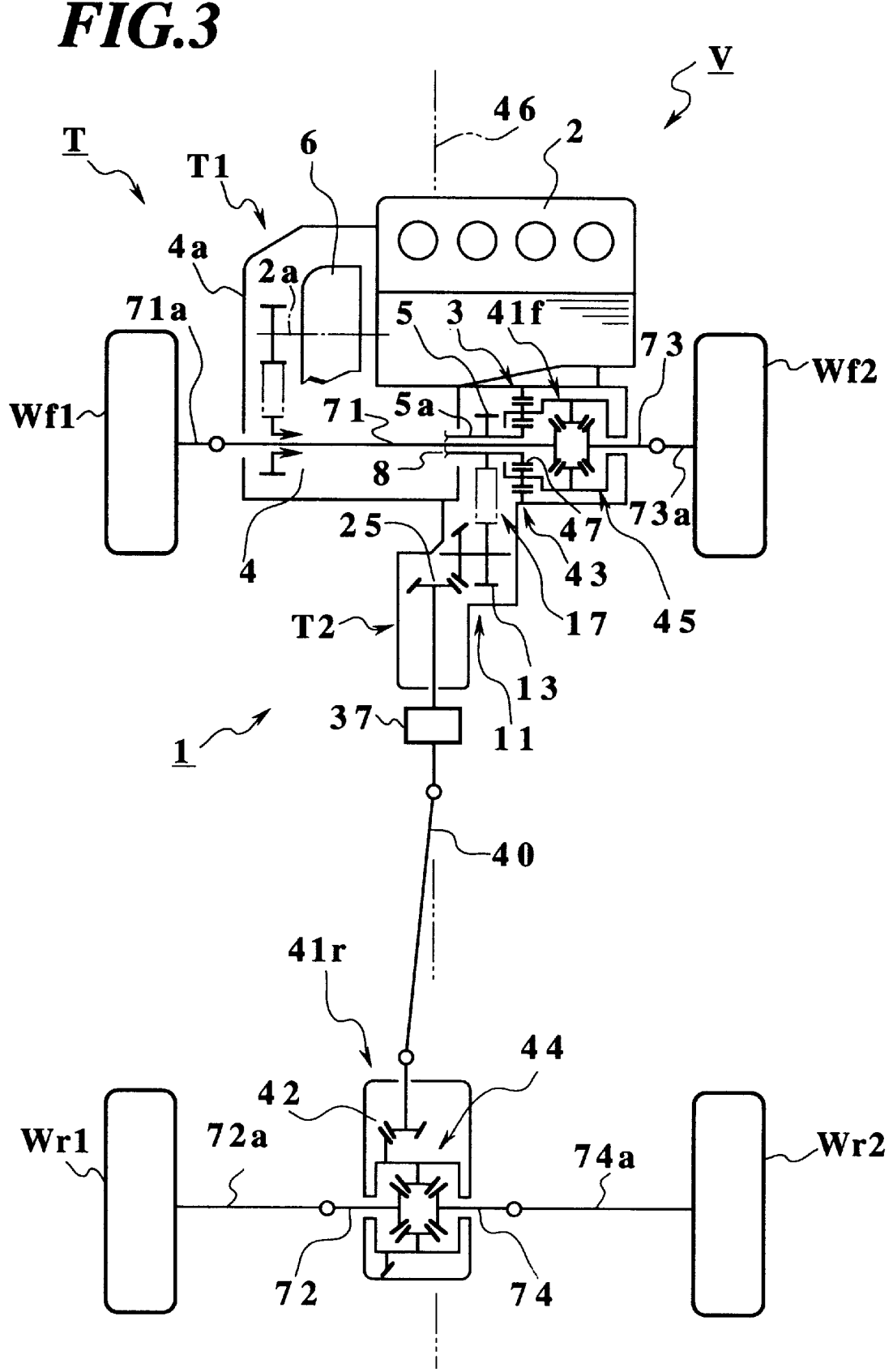
FIG. 3 is a block diagram of a four-wheel drive vehicle with a power train according to an embodiment of the invention.
Figure 4:
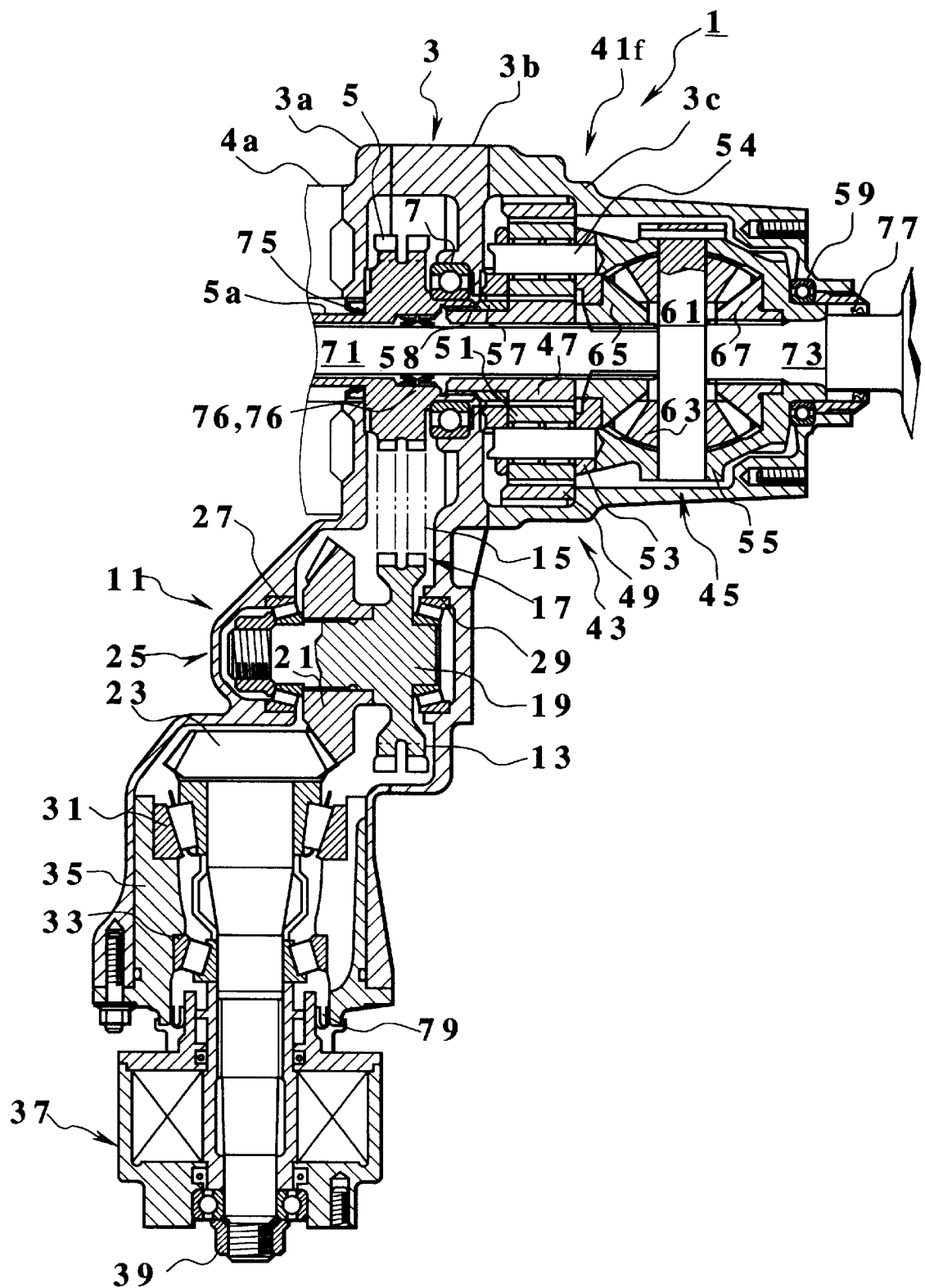
FIG. 4 is a section of the power train of FIG. 3.

FIG. 3 shows drive connections in a vehicle V equipped with a power train T including a power transfer device according to a first embodiment of the invention, and FIG. 4, a mechanical constitution of the transfer device.

As shown in FIG. 3, the vehicle V has a horizontal front engine 2 with a crankshaft axis 2a extending in a transverse direction of the vehicle, and a total of four drive wheels, i.e., a pair of left and right front wheels Wf1, Wf2 and a pair of left and right rear wheels Wr1, Wr2. The front wheels Wf1, Wf2 are driven with shafts 71a, 73a articulating on outer ends of left and right front axles 71, 73. Likewise, the rear wheels Wr1, Wr2 are driven with shafts 72a, 74a articulating on outer ends of left and right rear axles 72, 74.

Drive power generated at the engine 2 is transmitted as torque from a crankshaft of the engine 2 to the axles 71 to 74 in a differentially distributing manner through the power train T.

The power train T comprises a first power train T1 for driving the front axles 71, 73, and a second power train T2 for driving the rear axles 72, 74.

The first power train T1 comprises an automatic transmission gear box (hereafter sometimes "transmission") 4 composed of a planetary gear set and a multi-disc clutch, and a front drive train 41f that includes a front final speed reduction gear mechanism (hereafter sometimes "front final gear") 43 and a front differential gear set (hereafter sometimes "front differential") 45.

The second power train T2 comprises a rear transfer train 11 that includes a chain drive transfer mechanism 17, a bevel gear set 25 and a viscous coupling 37, a propeller shaft 40, and a rear drive train 41r that includes a rear final speed reduction gear mechanism (hereafter sometimes "rear final gear") 42 and a rear differential gear set (hereafter sometimes "rear differential") 44. The coupling 37 may be any power coupling of a revolution speed difference sensing type, such s of a fluid type of solid type, e.g. an oil pump coupling.

The transfer device is constituted as a power transfer unit 1 (FIG. 4) accommodate din a transfer housing 3, and comprises the front drive train 41f and the rear transfer train 11. In the embodiment, the second power train T2 is branched from the first power train T1. In a modification for use in a gasoline/battery hybrid car, first and second power trains main be joined at their intermediate points.

The transmission 4 is transversely installed behind the engine 2. Drive torque from the engine 2 is input through a torque converter 6 to the planetary gear set of the transmission 4, where it is once change din speed to be output from an output gear 8 of which a shaft part is hollowed and operatively connected via the front drive train 41f to the left and right front axles 71, 73 aligned to be coaxial to the output gear 8. The left axle 71 is provided through the hollowed shaft part of the output gear 8.

As shown in FIG. 4, the transfer housing 3 comprises a left housing 3a, a central housing 3b and a right housing 3c. These housings 3a, 3b, 3c are mutually fastened tight. The left housing 3a is bolted to an output end of a transmission case 4a.

The left and central housings 3a, 3b cooperate with each other to define a space for accommodating therein a drive sprocket 5 as a torque sharing drive member of the transfer unit 1 and the remaining part of the rear transfer train 11 for a rearward transmission of torque to drive the rear axles 72, 74. The drive sprocket 5 has a transversely extending hollow shaft part 5a splined to the hollowed shaft part of the output gear 8 in the transmission 4.

The rear transfer train 11 has the chain drive transfer mechanism 17 including the drive sprocket 5, and the bevel gear set 25 directly connected to the transfer mechanism 17 and coupled via the viscous coupling 37 to a front end of the propeller shaft 40. A rear end of the propeller shaft 40 is connected to the rear drive train 41r comprised of the rear final gear 42 and the rear differential 44.

The right housing 3c accommodates the front drive train 41f supplying drive torque to the front axles 71, 73. The front drive train 41f has the front final gear 43 and the front differential 45 arranged coaxial relative to the drive sprocket 5.

The final reduction gear 43 in the front drive train 41f is a planetary type of which a sun gear 47 is arranged coaxial to the shaft part 5a of the drive sprocket 5 and splined to a right end thereof. In a modification for use to a two-wheel drive vehicle, the sun gear 47 may be directly splined to the output gear 8 of the transmission 4. The front differential 45 serves for a differential distribution of drive torque to and between the left and right front axles 71, 73.

The drive sprocket 5 is supported at the right end of the axial part 5a by a bearing 7 fixed to the central housing 3b. The sprocket 5 is driven by the output gear 8 of the transmission 4, to rotate about a common axis.

In the rear transfer train 11, an intermediate shaft 19 is driven to be rotated by the chain drive transfer mechanism 17 comprised of the drive sprocket 5, a driven sprocket 13 and a looped chain 15. The chain 15 is relaxed when applied over the sprockets 5 and 13, and becomes tensioned when transmitting drive power. The intermediate shaft 19 has a bevel gear 21 splined to be forcibly fitted thereon, which gear 21 meshes with a bevel pinion 23, changing the direction of a power path to convey torque toward the rear drive train 41r. The intermediate shaft 19 is rotatably supported at both ends thereof by bearings 27, 29 fixed to the housing 3. The bevel gear set 25 is comprised of the bevel gear 21 and the bevel pinion 23.

The bevel pinion 23 is rotatably supported by bearings 31, 33 in a carrier 35, and has the viscous coupling 37 rotatably assembled to a rear output part thereof by a nut 39. The viscous coupling 37 serves as a differential limiting element of a revolution speed difference sensing type. A cylindrical housing of the coupling 37 is centered to a longitudinal hollow hub, which is spline-connected at a front end thereof to a rear end of the carrier 35. An axial position of the hub is established by the nut 39. Such the sub-assembly is fixed to the transfer housing 3 with bolts fastening the carrier 35. The viscous coupling 37 is bolted at a rear outer part of its housing to a flange at the front end of the propeller shaft 40 to transmit torque to the rear drive train 41r.

The planetary type final reduction gear 43 in the front drive train 41f has the sun gear 47 splined at a left boss part thereof to be connected inside an enlarged right end part of the hollow shaft part 5a of the drive sprocket 5, and the front differential 45 of a bevel gear type is arranged on the right side of the front final gear 43.

The final reduction gear 43 has a ring gear 49 serrated along an outer circumference thereof to be integrally fixed inside the right housing 3c and kept from a relative rotation thereto, and a plurality of planet gears 63 intermeshing between the ring gear 49 and the sun gear 47, which planet gears 51 are rotatably fitted on a corresponding number of planet support shafts 54 held at their relative angular positions by a planet shaft carrier 53.

The planet shaft carrier 53 is integrally fixed or joined at a right half thereof to a left portion of a differential case 56 or gear carrier of the front differential 45. A left half of the planet shaft carrier 53 is rotatably fitted to be supported by a ring 58 on the boss part of the sun gear 47, with a bearing 57 interposed therebetween. A right boss part of the differential case 55 is rotatably fitted in and supported by a right end part of the right housing 3c, with a bearing 59 interposed therebetween.

Drive torque supplied through the shaft part 5a of the drive sprocket 5 to the front drive train 41f is input to the front final gear 43, where it is changed in speed in the way from the sun gear 47 integrally rotating with the drive sprocket 5 to the planet shaft carrier 53 where it is output. As the planet shaft carrier 53 is integrated with the differential case 55, drive torque from the carrier is directly input to the front differential 45.

The front differential 45 has accommodated in the case 55 a pinion shaft 61 integrally rotatable therewith, pinion gears 63 rotatably supported on the pinion shaft 61, and mutually opposing left and right side gears 65, 67 meshing with the pinion gears 63. The left and right side gears 65, 67 serve as output gears and are splined on inner ends of the left and right front axles 71, 73, respectively. The left axle 71 is provided thorough respective hollow shaft parts of the sun gear 47 in the front final gear 43, the drive sprocket 5 and the output gear 8 of the transmission 4.

The transfer housing 3 has a body of lubricant filled therein, and oil seals 75, 76, 77 and 79 are installed at appropriate points to prevent leakage.

The rear transfer train 11 is accommodated in a space defined by a combination of the left and central housings 3a, 3b and separated from that defined within the right housing 3c where the front drive train 41f is installed, permitting a closer location to a vehicle centerline 46.

Drive torque from the engine 2 is transmitted through the transmission 4, where it is once changed in speed, and from the output gear 8 to the drive sprocket 5, where it is shared to branch into the rear transfer train 11, so that the rest is input to the front drive train 41f.

Input torque to this drive train 41f is changed in speed at the front final gear 43 and shared at the front differential 45 for a differential distribution to and between the left and right front axles 71, 73, permitting a differential rotation in dependence on a varying difference in resistance to drive torque therebetween.

Branched torque to the rear transfer train 11 is a fraction of the drive torque transmitted to the drive sprocket 5, without experiencing a speed reduction and an associated torque increment that otherwise might have been effected at the front final gear 43. The branched torque, which is thus smaller than a conventional, have smaller loads imposed on associated components such as the chain drive transfer mechanism 17 and the bevel gear set 25 on the way of power transference to the rear drive train 41r.

It therefore becomes possible to make the components comprising the rear transfer train 11 as well as the rear drive train 41r in its entirety, lighter in weight and smaller in size.

Moreover, the front drive train 41f is wholly aligned with the transversely extending axles 71, 73 and disposed near the vehicle centerline 46, permitting an optimized transverse and/or longitudinal location of the center of gravity of the rear transfer train 11 employing the chain drive mechanism 17.

Further, as the rear transfer train 11 is enclosed within the left and central housings 3a, 3b and the front drive train 41f is enclosed within the left housing 3c, these major component assemblies can adapt themselves well to unit construction, providing a high degree of drive train component interchangeability and an enhanced design commonality between two-wheel drive and four-wheel drive power trains.

Figure 5:
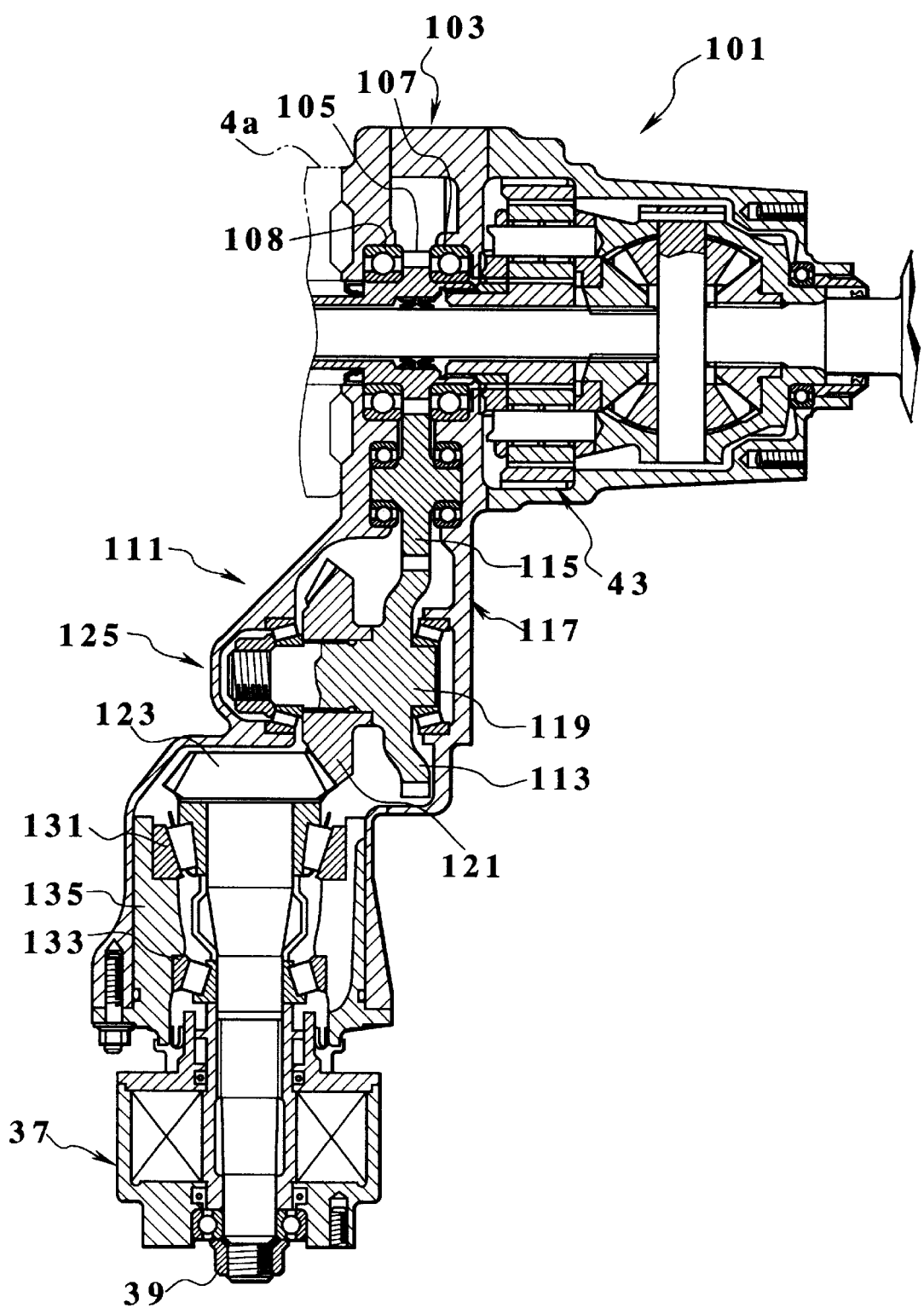
FIG. 5 is a section of a power train according to another embodiment of the invention.

FIG. 5 shows a power transfer device 101 of a four-wheel drive vehicle power train according to a second embodiment of the invention. This embodiment is analogous to the first embodiment, unless otherwise described or depicted.

The transfer device 101 has a drive gear 105 as an input member thereof, which gear 105 is rotatably supported at both transverse ends by a pair of left and right bearings 108, 107 fixed in left and central sections of a transfer housing 103 and splined to be coaxially connected at a left end of a hollow shaft part thereof to an output gear of a transmission of which a housing 4a is depicted in FIG. 5.

The transfer device 101 comprises a front drive train including a front final reduction gear mechanism 43, and a rear transfer train 111 including a gearing transfer mechanism 117, a bevel gear mechanism 125 and a viscous coupling 37. The transfer mechanism 117 comprises the drive gear 105, an idler gear 115, and a driven gear 113 integrated with an intermediate shaft 119 in a one-piece construction. The bevel gear mechanism 125 comprises a bevel gear 121 splined and forcibly fitted on the shaft 119, and a bevel pinion 123 meshing with the bevel gear 121. The viscous coupling 37 has a housing assembled to a carrier 135 rotatably supported by a pair of bearings 131, 133, and a hub axially positioned by a nut 39.

The rear transfer train 111 is branched from a power train including the transmission and the front drive train, at the drive gear 105 installed upstream of the front final gear 43, achieving similar effects to the first embodiment.

FIG. 6 shows a power transfer device 201 of a four-wheel drive vehicle power train according to a third embodiment of the invention. This embodiment also is analogous to the first embodiment, unless otherwise described or depicted.

The transfer device 201 comprises part of a first power train T1 including a center differential gear set (hereafter sometimes "center differential") 203 and a front drive train 241f connected thereto, and part of a second power train T2 including a rear transfer train 201 branched from the first power train T1 at the center differential 203.

The first power train T1 includes a transmission of which an output shaft 271 has an output gear 209 connected via an idler gear 211 to a ring gear 207 of the center differential 203, which gear 207 is integrated with a differential case 205 receiving drive torque transmitted from an engine.

The center differential 203 is a bevel gear type in which a pair of mutually opposing left and right output side gears 213, 215 differentially output the torque received by the differential case 207, so that this torque is shared to be distributed on the one hand through a left output shaft 217 to the rear transfer train 201 that includes a transverse transfer mechanism 243 connected to the left output shaft 217 and a longitudinal transfer mechanism 249 connected via a propeller shaft to a rear drive train for driving a pair of rear axles, and on the other hand, through a right output shaft 219 to the front drive train 241f that includes a longitudinal gear train 251 connected to the right output shaft 219, a front final reduction gear mechanism 253 of a planetary type arranged coaxial to the transmission output shaft 271 and connected to the gear train 251, and a front differential gear set 255 of a bevel gear type connected between the front final gear 253 and a pair of front axles 265, 267 of which a left one 265 extends through the transmission output shaft 271.

The center differential 203 distributes the input drive torque in a differential manner, allowing for a difference developed between drive resistances of the left and right output shafts 213, 215.

The transverse transfer mechanism 243 comprises a bevel gear 245 fixed on the left output shaft 217 of the center differential 205. The longitudinal transfer mechanism 249 comprises a bevel pinion 247 meshing with the bevel gear 245, turning a torque transmitting direction at a right angle.

The gear train 251 comprises a drive gear 257 fixed on the right output shaft 219 of the center differential 203, an idler gear 259 meshing with the drive gear 257, and a driven gear 261 meshing with the idler gear 259. The driven gear 261 is arranged coaxial to the output gear 209 of the transmission, and is coaxially connected at a right end thereof to a sun gear 263 as an input member of the front final reduction gear 253. This final gear 253 as well as the front differential 255 may be identical to the previous embodiments. The left front axle 265 is provided through respective shaft parts of the driven gear 261 of the front final gear 251 and the output gear 209 of the transmission.

Branched torque to the rear transfer train 201 is a fraction of the drive torque transmitted to the center differential 203, without a speed reduction and an associated torque increment that otherwise might have been effected at the front final gear 253. The branched torque have smaller loads imposed on associated components such as the transverse and longitudinal transfer mechanisms 243, 249 on the way of power transference to the rear drive train.

It therefore becomes possible to make the components comprising the rear transfer train 201 as well as the rear drive train in its entirety, lighter in weight and smaller in size.

Moreover, the front drive train 241f is aligned with the transversely extending axles 265, 267 and disposed near a vehicle centerline, permitting an optimized transverse location of the center of gravity of the rear transfer train 201.

Further, as the rear transfer train 201 is enclosed within the left and central sections of the transfer housing 3 and the front drive train 241f is enclosed within a right section thereof, these major component assemblies can adapt themselves well to unit construction, providing a high degree of drive train component interchangeability and an enhanced design commonality between two-wheel drive and four-wheel drive power trains.

While preferred embodiments of the present invention have been described using specific terms, such description is for illustrative purposes, and it is to be understood that changes and variations may be made without departing from the spirit or scope of the following claims.

What is claimed is:

1. A power train for a vehicle with an engine and front and rear drive wheels, the power train comprising:

a first power train adapted to drive front drive wheels, the first power train including:
a front transmission connected to the engine, the transmission having a hollow torque output shaft extending in a transverse direction of the vehicle;
a front reduction gear connected to the hollow torque output shaft of the transmission;
a front differential gear set connected to the front reduction gear; and
axles of the front wheels connected to the front differential gear set, one of the axles extending through the hollow torque output shaft of the transmission; and a second power train adapted to drive the rear drive wheels, the second power train including:
a power transfer train branched from the first power train between the hollow torque output shaft of the transmission and the front reduction gear;
a rear reduction gear connected to the power transfer train; and
a rear differential gear set connected between the rear reduction gear and the rear drive wheels.

* * * * *